US005450295A

United States Patent [19]

Nino

[11] Patent Number: 5,450,295

[45] Date of Patent: Sep. 12, 1995

[54] REFLECTOR FOR ILLUMINATION LAMP CAPABLE OF PRODUCING A STELLATE LIGHT DISTRIBUTION PATTERN

[75] Inventor: Naohi Nino, Shizuoka, Japan

[73] Assignee: Koito Manufacturing Co., Ltd., Tokyo, Japan

[21] Appl. No.: 130,550

[22] Filed: Oct. 1, 1993

[30] Foreign Application Priority Data

Jan. 18, 1993 [JP] Japan ..... 5-021679

[51] Int. Cl.$^6$ ..... B60Q 1/00

[52] U.S. Cl. ..... 362/346; 362/304; 362/277

[58] Field of Search ..... 362/61, 297, 346, 304, 362/347, 310, 307

[56] References Cited

U.S. PATENT DOCUMENTS

| | | | |
|---|---|---|---|
| 4,841,423 | 6/1989 | Luciani | 362/346 |
| 4,943,894 | 7/1990 | Nakata | 362/346 |
| 4,945,454 | 7/1990 | Bunse et al. | 362/346 |
| 5,079,677 | 1/1992 | Kumagai | 362/346 |
| 5,086,376 | 2/1992 | Blusseau | 362/346 |

FOREIGN PATENT DOCUMENTS 4200989 8/1992 Germany .

*Primary Examiner*—Ira S. Lazarus
*Assistant Examiner*—Thomas M. Sember
*Attorney, Agent, or Firm*—Sughrue, Mion, Zinn, Macpeak & Seas

[57] ABSTRACT

The xyz orthogonal coordinate system is set so that the x-axis coincides with the optical axis of a reflecting surface. A fundamental surface has a reference point on the x-axis and a reference parabola included in a plane inclined, in a generalized form, from the xy-plane and having a vertex on the origin of the coordinate system and a focus on the x-axis in the rear of the reference point. The fundamental surface is a collection of intersecting lines each obtained by cutting an imaginary paraboloid of revolution having an axis extending in parallel with a ray vector direction taken by a reflected ray after being emitted from the reference point and then reflected at a reflecting point on a parabola that is an orthogonal projection of the reference parabola onto the xy-plane, passing through the reflecting point; and having a focus at the reference point by a plane in parallel with the z-axis and including the ray vector. The reflecting surface is formed by periodically arranging identical sectors of the number of apices of an intended stellate light distribution pattern around the optical axis. Each sector has a shape of a generally fan-shaped portion of the fundamental surface having a central angle of 360° divided by the number of apices of the stellate pattern and located in the vicinity of the xy-plane or xz-plane.

17 Claims, 17 Drawing Sheets

REFLECTOR FOR ILLUMINATION LAMP CAPABLE OF PRODUCING A STELLATE LIGHT DISTRIBUTION PATTERN

BACKGROUND OF THE INVENTION

The present invention relates to a reflector for an illumination lamp.

Lamps for the highlighting purpose in stores etc. have, as the basic configuration, a paraboloid-of-revolution reflector and a light source disposed at the focus of the reflector.

That is, as shown in FIG. 24, a reflector a of an illumination lamp has a shape of a paraboloid of revolution and a filament c of a bulb b is disposed along the optical axis L-L in the vicinity of the focus of the reflector a. As is apparent from the rotation symmetry of the reflector a about the optical axis L-L, filament images e, e, . . . are arranged radially from an intersection o of the optical axis L-L and a screen d and collectively form a circular projection pattern by the reflector a.

However, the above illumination lamp reflector can produce only limited types of projection patterns, i.e., circular and fan-shaped patterns. For example, it is difficult for the above reflector to produce stellate patterns as shown in FIG. 25.

FIG. 25 shows four stellate figures formed by line segments each connecting two apices of a regular polygon not adjacent to each other (in the following, a stellate figure corresponding to a regular polygon having n apices is called an "n-apex star"). It is assumed that a 3-apex star and 4-apex star are a triangle and a square, respectively.

The reason why the conventional lamps cannot produce the above stellate patterns is that the apex portions of an n-apex star cannot be formed as long as the filament images e, e, . . . are arranged in a concentric manner around point o that is located on the optical axis L-L.

SUMMARY OF THE INVENTION

An object of the present invention is to provide a novel illumination lamp reflector which can produce a stellate light distribution pattern.

According to the invention, an illumination lamp for producing a triangular, square or stellate light distribution pattern comprises:

- a reflecting surface having an optical axis and a fundamental surface which, when an xyz orthogonal coordinate system is set so that the x-axis coincides with the optical axis, has a reference point on the x-axis and a reference parabola included in a plane inclined, in a generalized form, from the xy-plane and having a vertex on the origin of the coordinate system and a focus on the x-axis in the rear of the reference point, and which is a collection of intersecting lines each obtained by cutting an imaginary paraboloid of revolution having an axis extending in parallel with a ray vector direction taken by a reflected ray after being emitted from the reference point and then reflected at a reflecting point on a parabola that is an orthogonal projection of the reference parabola onto the xy-plane, passing through the reflecting point, and having a focus at the reference point by a plane in parallel with the z-axis and including the ray vector, said reflecting surface being formed by periodically arranging identical reflecting sectors of a number of apices of the stellate pattern around the optical axis, each of the reflecting sectors having a shape of a generally fan-shaped portion of the fundamental surface having a central angle determined in accordance with the number of apices of the stellate pattern and located in the vicinity of the xy-plane or xz-plane; and
- a light source having a central axis extending along the optical axis.

BRIEF DESCRIPTION OF THE DRAWINGS

FIG. 2(*b*) is a front view illustrating how respective sectors are arranged to construct a reflecting surface in the first method;

FIG. 3(*b*) is a front view illustrating how respective sectors are arranged to construct a reflecting surface in the second method;

FIG. 8(*b*) shows a positional relationship between a filament and foci in the first embodiment;

FIG. 9(*b*) shows filament images produced by the sector of FIG. 9(*a*);

FIG. 11(*b*) shows a positional relationship between the filament and the foci in the second embodiment;

FIG. 12(*b*) shows filament images produced by the sector of FIG. 12(*a*);

DESCRIPTION OF THE PREFERRED EMBODIMENT

Illumination lamp reflectors according to embodiments of the present invention are hereinafter described with reference to the accompanying drawings.

Before describing the configuration of a reflector according to the invention, I explain the shape of its fundamental surface.

The fundamental surface is of the type disclosed in U.S. patent application Ser. No. 07/808,670 filed by the present applicant, and is summarized below.

Figure 1:
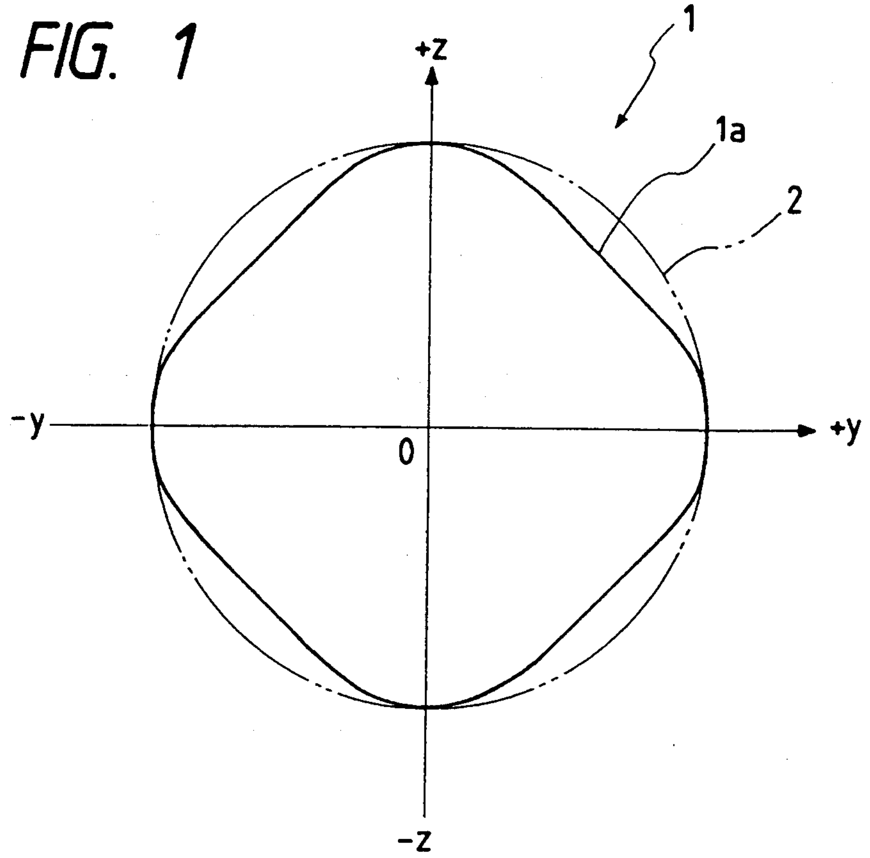
FIG. 1 is a schematic front view of a fundamental surface according to the present invention.

FIG. 1 shows a front view of a fundamental surface 1, in which an outline la is located within an imaginary circle 2 having point O as its center so as to be in contact with the circle 2 at four points, i.e., top, bottom, right and left points.

The coordinate system for the reflecting surface 1 is defined as follows. The optical axis of the reflecting surface is selected as the x-axis (extending perpendicularly to the paper surface of FIG. 1). The axis perpendicular to the x-axis and extending in the horizontal direction is selected as the y-axis (the right-hand side of FIG. 1 is the positive side). The axis perpendicular to the x-axis and extending in the vertical direction is selected as the z-axis (the upper half of FIG. 1 is the positive half). The origin of the orthogonal coordinate system is located at point O.

The fundamental surface 1 is symmetrical with respect to both of the xy-plane and the xz-plane. In the invention, a reflecting surface is formed by periodically disposing a portion of the fundamental surface 1 around the x-axis.

Figure 4:
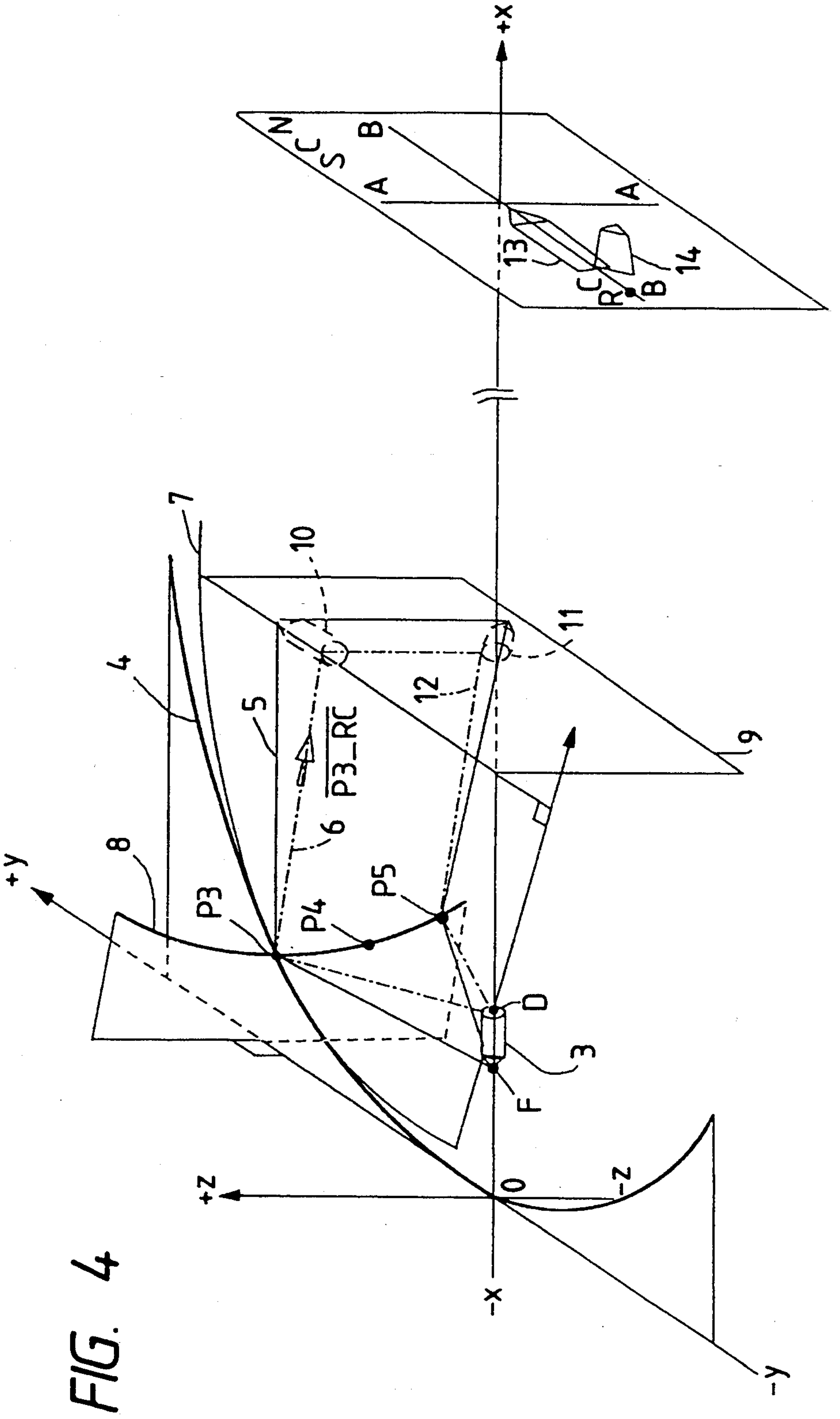
FIG. 4 is a light path diagram with the fundamental surface of the invention.

FIG. 4 illustrates the fundamental surface 1. A filament 3 is disposed between point F (hereinafter called a "first focus") and point D (hereinafter called a "second focus"), with its central axis along the x-axis. Point D is deviated from point F by a distance d in the positive direction of the x-axis.

To clarify the orientation of the filament 3, an assumption "the filament 3 has a pencil-like form with its one tip on the side of point F having a cone-like pointed shape and the other tip on the side of point D being flat" is employed just for convenience of description.

First, a parabola 4 having a focus at point F is assumed on the xy-plane.

After being emitted from point F (near the rear end of the filament 3) and then reflected at point P3 on the parabola 4, a ray 5 travels in parallel with the optical axis (i.e., x-axis). On the other hand, after being emitted from point D (near the front end of the filament 3) and then reflected at point P3, a ray 6 travels toward point RC on a screen SCN far from the reflector and crosses the optical axis. That is, the ray 6 has a vector P3_RC as its direction vector.

Now, another parabola 7 is assumed which has a focus at point D and an axis extending parallel with the vector P3_RC. As shown in FIG. 4, the parabola 7 also passes through point P3.

A paraboloid of revolution is obtained by rotating the parabola 7 about its axis, and a parabola 8 is obtained by cutting this paraboloid of revolution by a plane including the vector P3_RC and perpendicular to the xy-plane.

The fundamental surface 1 is generated as a collection of the parabolas 8 obtained as point P3 is moved along the parabola 4.

Filament images are projected onto a plane 9 in the following manner in the midst of traveling of rays toward the screen SCN. An image 10 due to point P3 is in parallel with the axis B-B that corresponds to the y-axis. An image 11 due to point P5 that is on the parabola 8 and lower than point P3 forms a certain angle with the horizontal line. The path taken by a ray 12 after being reflected at point P5 is in parallel with the path taken by the ray 6 after being reflected at point P3 (both of the rays 6 and 12 are emitted from point D).

Since the intersecting line is defined so that the rays relating to the formation of the flat ends of the filament images 10 and 11 become in parallel with each other, filament images 13 and 14 are formed on the screen SCN with point RC as their rotation center (the above parallel rays substantially coincide with each other at point RC).

Figure 5:
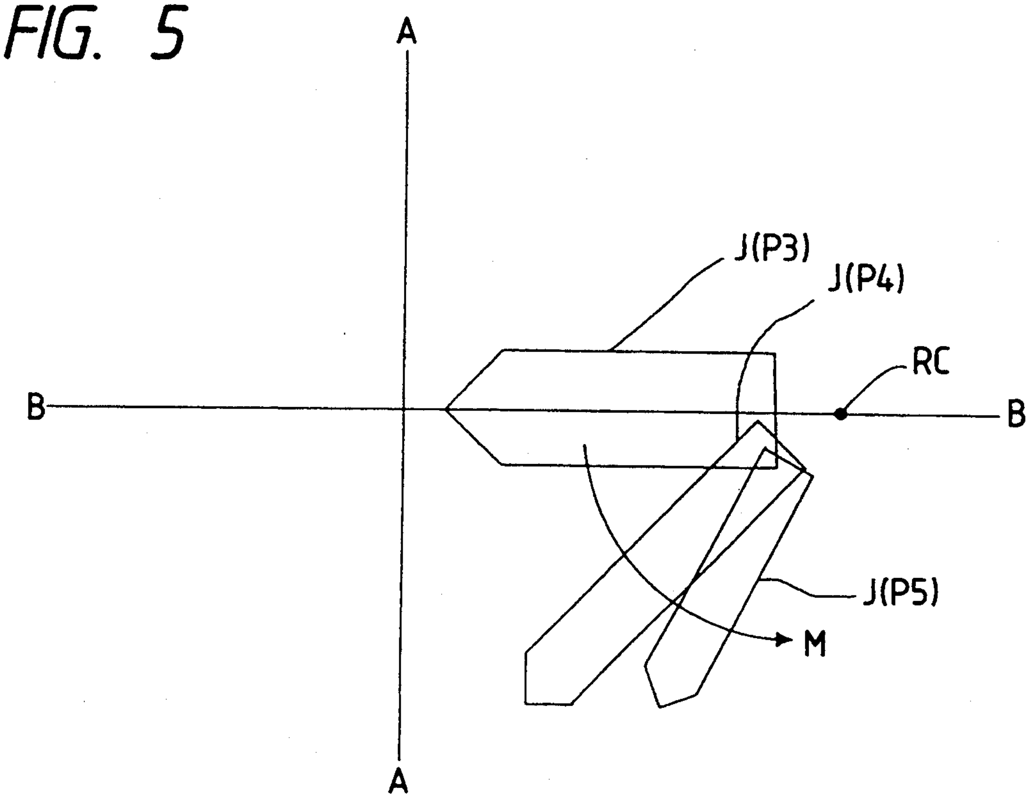
FIG. 5 shows an arrangement of filament images produced by the fundamental surface of the invention.

FIG. 5 schematically shows an arrangement of the filament images due to points P3 and P5, and point P4 that is on the parabola 8 and located between points P3 and P5.

In FIG. 4, J(X) indicates a filament image corresponding to each representative point X. Filament images J(P3), J(P4) and J(P5) due to points P3, P4 and P5 are arranged with point RC on the axis B-B as their rotation center. That is, as indicated by arrow M, the filament image rotates counterclockwise about point RC as the reflection point goes down (P3→P4→P5). The filament images are located under the axis B-B while their flat ends are always directed to point RC.

Figure 6:
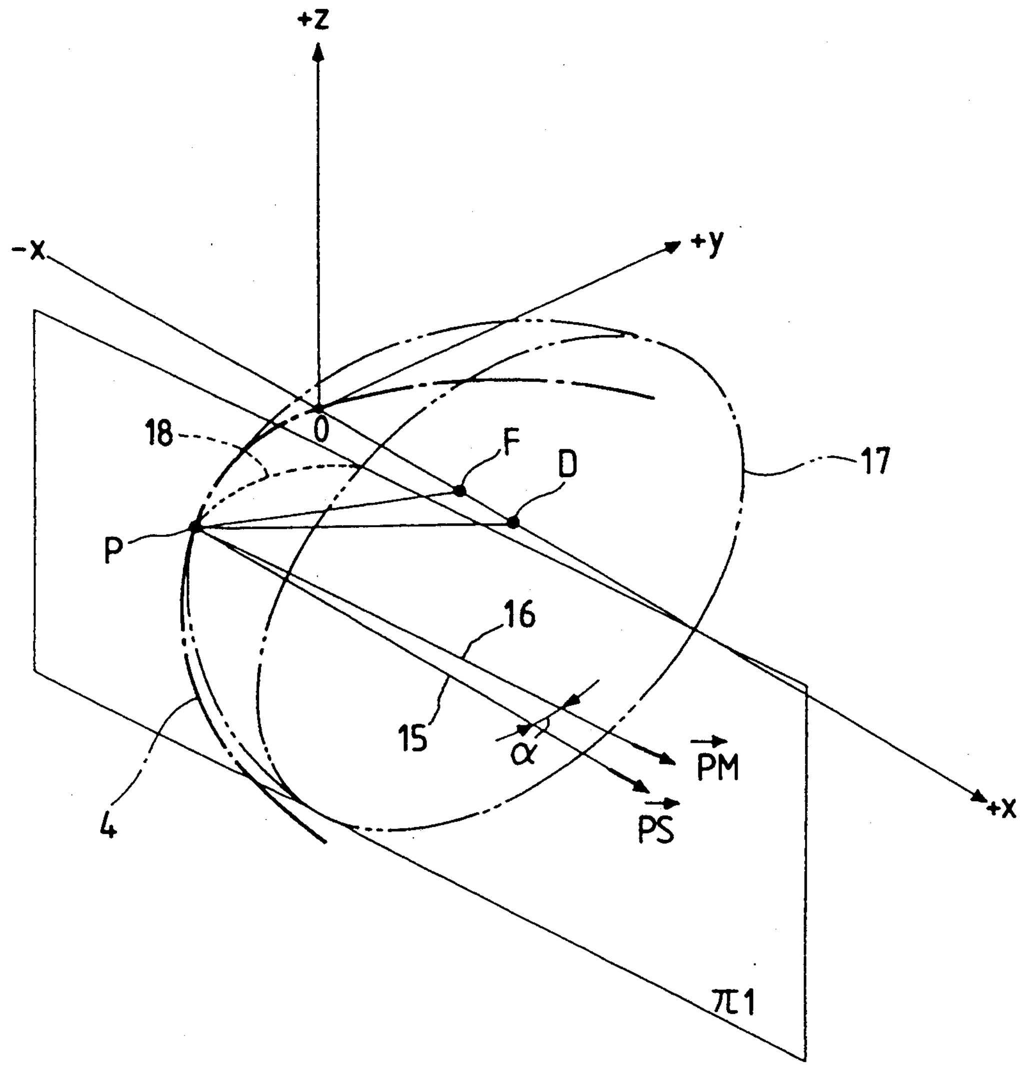
FIG. 6 is a perspective view schematically illustrating formation of the fundamental surface of the invention.

FIG. 6 shows how the fundamental surface 1 is generated. In FIG. 6, point P is an arbitrary point located on the parabola 4 that is included in the xy-plane. (By introducing a parameter q, coordinates of point P are expressed as $(q^2/f, -2q, 0)$.) After being emitted from point F and then reflected at point P, a ray 15 travels in parallel with the x-axis as indicated by a vector PS.

On the other hand, after being emitted from point D and then reflected at point P with a reflection angle smaller than that of the ray 15 according to the law of reflection, a ray 16 travels straight (indicated by a vector PM) forming a certain angle $\alpha$ with the ray 15.

Now, an imaginary paraboloid of revolution 17 (indicated by a two-dot chain line) is assumed which has a focus at point D passes through point P and has an axis extending parallel with the ray vector PM. A cross-sectional curve is obtained by cutting the paraboloid of revolution 17 by a plane $\pi 1$ including the ray vector PM and parallel with the z-axis. (An intersecting line 18 of the paraboloid of revolution 17 and the plane $\pi 1$.)

It is apparent that the above cross-sectional curve (indicated by a dashed line) is a parabola. The fact that rays emitted from point D and then reflected at arbitrary points on the intersecting line 18 travel in parallel with each other conform to the situation described in connection with FIG. 4.

In this manner, the fundamental surface 1 is obtained as a collection of intersecting lines of the imaginary paraboloids of revolution corresponding to points P on the parabola 4 and the planes that are parallel with the respective axes of the imaginary paraboloids of revolution and the z-axis.

This curved surface is expressed by Eq. 1 with the use of parameters shown in Table 1.

TABLE 1

| Parameter | Definition |
|---|---|
| f | Focal length of parabola 4 ($\overline{OF}$) |
| d | Interval between points F and D ($\overline{FD}$) |
| q | Specifying a point on parabola 4 |
| h | Height in z-direction from plane z = 0 |
| Q | = $(f^2 + q^2)/f$ |

$$x = \frac{(Q-f)\left[1 + \frac{2d(Q-f)}{Q^2 + (2f-Q)d}\right] + \frac{h^2}{4f(1 + d/Q)}}{1 + \frac{2d(Q-f)}{Q^2 + (2f-Q)d}}$$

$$y = 2q\left[\frac{d(x-Q+f)}{Q^2 + (2f-Q)d} - 1\right] \qquad (1)$$

$$z = h$$

$$\text{where } Q = \frac{f^2 + q^2}{f}$$

The process of deriving Eq. 1 is not described here because doing so may unduly complicate the description of the invention. But it is noted that Eq. 1 can be obtained based on only the above description and knowledge of elementary algebraic geometry. Further, it is understood that Eq. 1 also expresses paraboloids of revolution as a special case of d=0.

Equation 1 is generalized into Eq. 2 in which a parabola on a plane inclined from the xy-plane by an angle θ (the counterclockwise direction in FIG. 1 is the positive direction) is employed instead of the parabola 4.

Figure 2A:
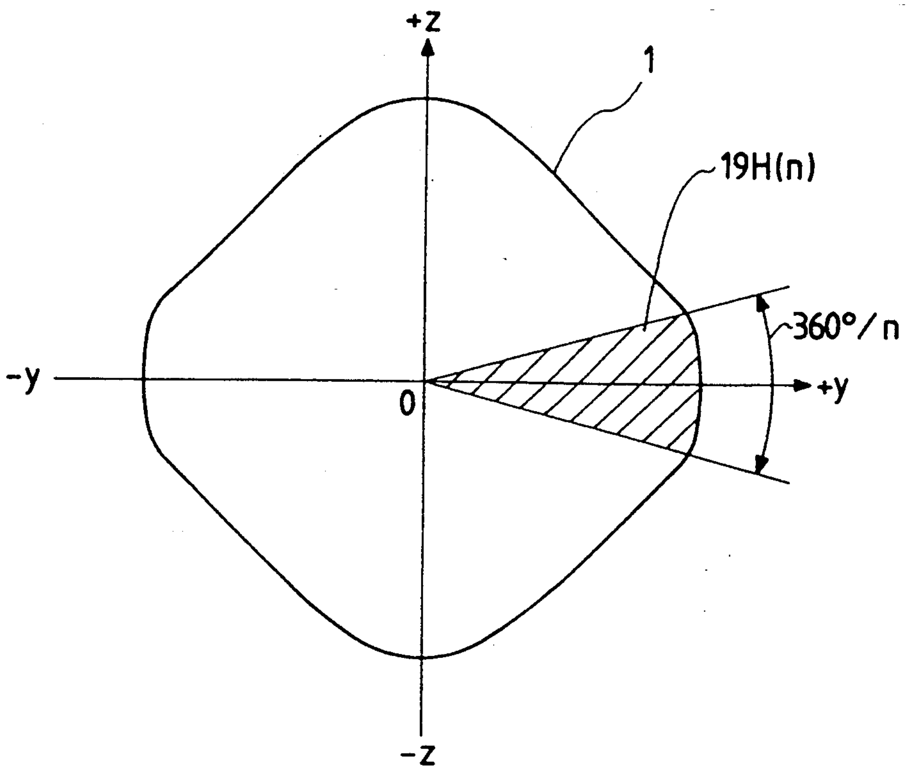
FIG. 2(*a*) is a front view showing a portion of the fundamental surface used in a first method.
Figure 2B:
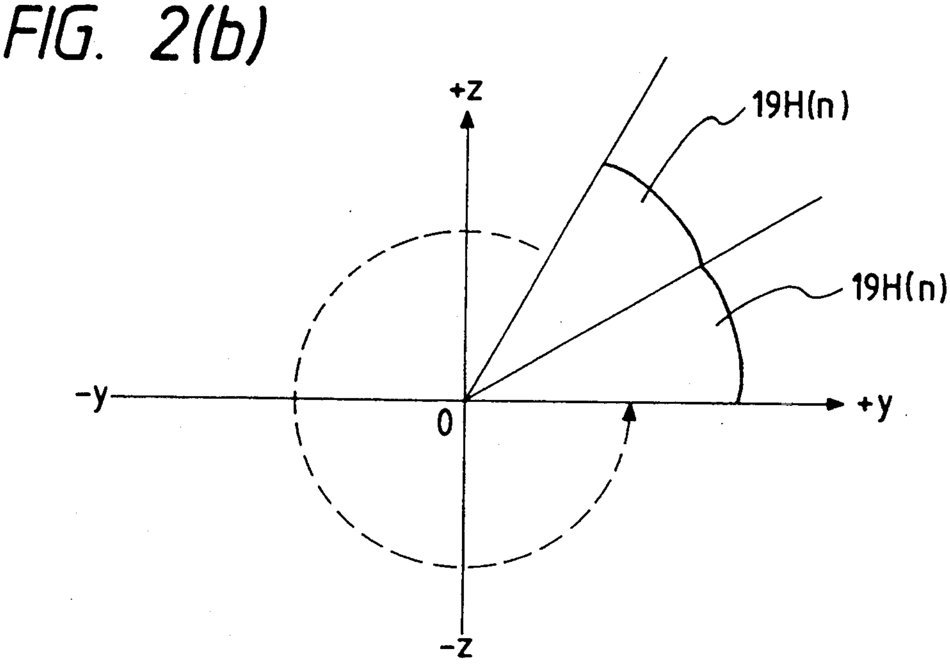

More specifically, according to the first method, the fan-shaped sector 19H(*n*) occupying an angular range −180°/n≦ θ≦180°/n is taken from the fundamental surface 1 (see FIG. 2(*a*)), and rotated about the x-axis by 180°/n to produce a basic sector (see FIG. 2(*b*)). A reflecting surface is constructed by arranging n sectors congruous to the sector 19H(*n*) around the x-axis starting from θ=0°.

Figure 3A:
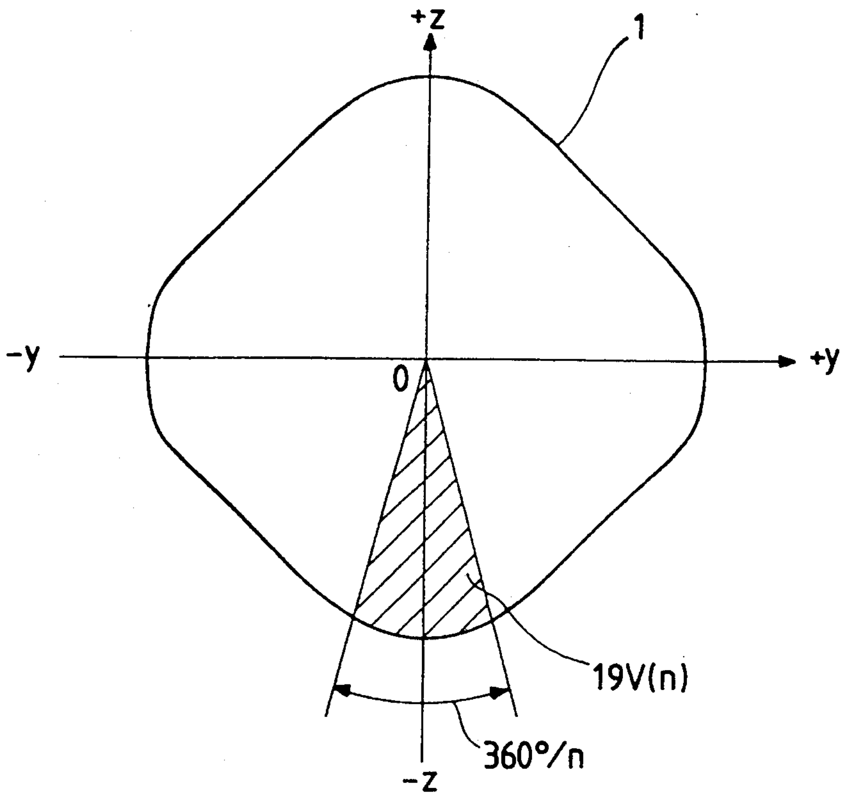
FIG. 3(*a*) is a front view showing a portion of the fundamental surface used in a second method.
Figure 3B:
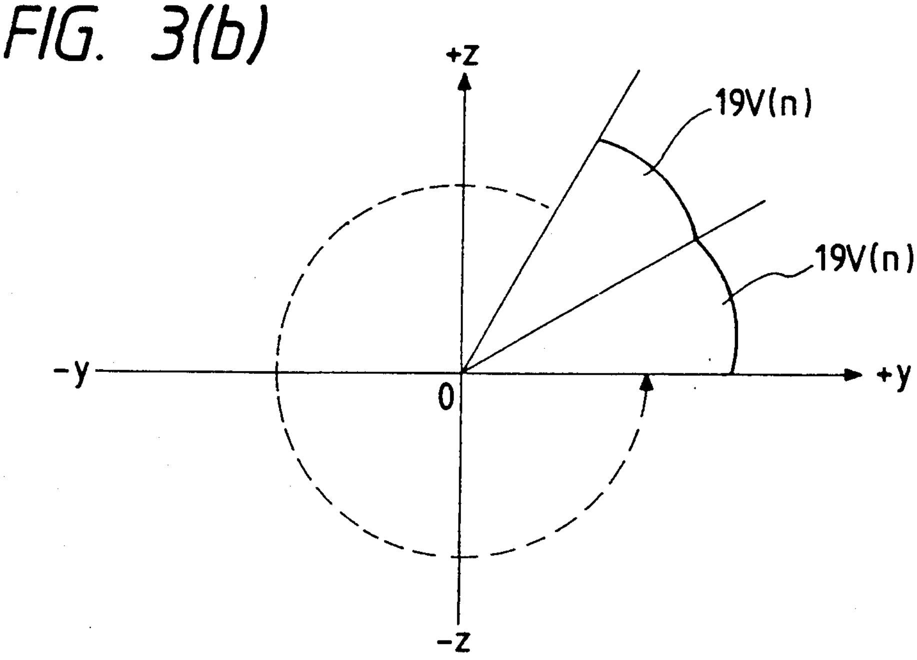

According to the second method, the fan-shaped sector 19V(*n*) occupying an angular range 270°−180°/n≦θ≦270°+180°/n is taken from the fundamental surface 1 (see FIG. 3(*a*)), and rotated about the x-axis by 90°+180°/n to produce a basic sector (see FIG. 3(*b*)). A reflecting surface is constructed by arranging n sectors congruous to the sector 19V(*n*) around the x-axis starting from θ=0°.

As is apparent from the fact that the fundamental surface 1 is symmetrical with respect to both of the xz-plane and the xy-plane, the same result as in the above case is obtained by taking a sector occupying an angular range 180°−180°/n≦θ≦180°+180°/n in the first method or by taking a sector occupying an angular range 90°−180°/n≦θ=90°+180°/n in the second method.

Figure 7:
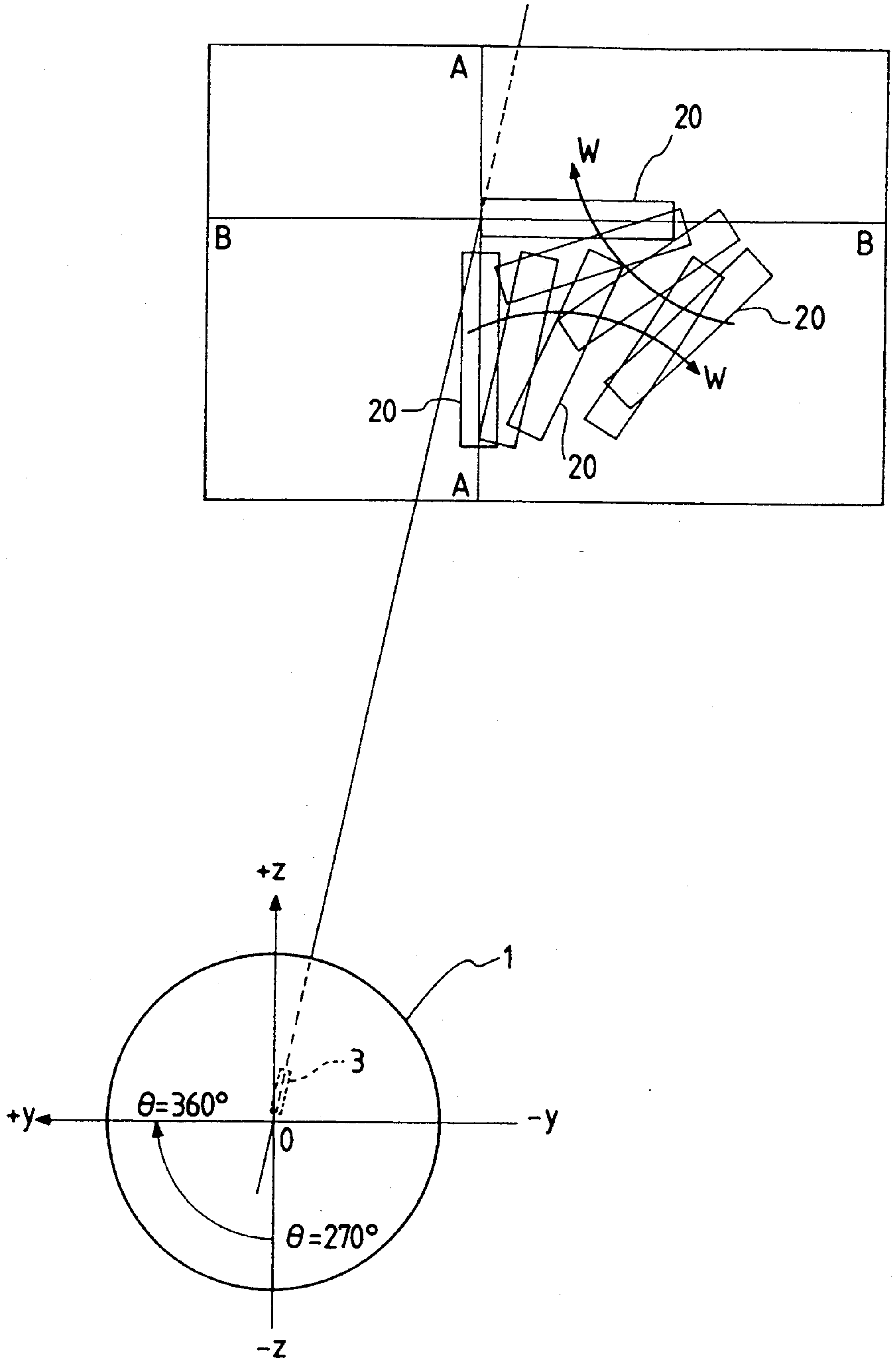
FIG. 7 shows how filament images are arranged as the reflecting point moves around the optical axis from $\theta=270°$ to 360°.

To indicate a difference in the arrangement of filament images between the two methods, FIG. 7 shows how the filament image moves as the reflecting point moves around the optical axis from θ=270° to 360°. As θ increases starting from 270°, the filament image 20 moves as indicated by arrow W. In FIG. 7, symbols A-A and B-B denote the vertical axis corresponding to the z-axis and the horizontal axis corresponding to the y-axis, respectively.

The first method uses the filament images 20 near the axis B-B, and the second method uses the filament images 20 near the axis A-A. It is understood from FIG. 7 that the first method can increase the brightness in a particular area more easily because of a large filament image movement for angles θ near 270° and a small movement for angles θ near 360°.

$$x = x(q,h,f,d,\theta) = \frac{(Q-f)\left[\frac{d}{Q} + \cos^2\theta\left(1 - \frac{d}{Q} + \frac{2d(Q-f)}{Q^2 + (2f-Q)d}\right)\right] + \frac{h^2}{4f(1 + d/Q)}}{1 + \frac{2d(Q-f)\cos^2\theta}{Q^2 + (2f-Q)d}}$$

$$y = y(q,f,d,\theta) = 2q\cos\theta\left[\frac{d(x-Q+f)}{Q^2 + (2f-Q)d} - 1\right] \qquad (2)$$

$$z = z(h) = h$$

$$\text{where } Q = \frac{f^2 + q^2}{f}$$

It is apparent that Eq. 1 is obtained by substituting θ=0 into Eq. 2.

A light distribution pattern of an n-apex star can be obtained by two kinds of methods for producing a reflecting surface of the invention. According to the "first method," as shown in FIGS. 2(*a*) and 2(*b*), a fan-shaped sector 19H(*n*) having a central angle of 360°/n and existing above and below the xy-plane is repeatedly disposed around the optical axis (n sectors are arranged). According to the "second method," as shown in FIGS. 3(*a*) and 3(*b*), a fan-shaped sector 19V(*n*) having a central angle of 360°/n and existing on the right and left sides of the xz-plane is repeatedly disposed around the optical axis (n sectors are arranged).

Figure 8A:
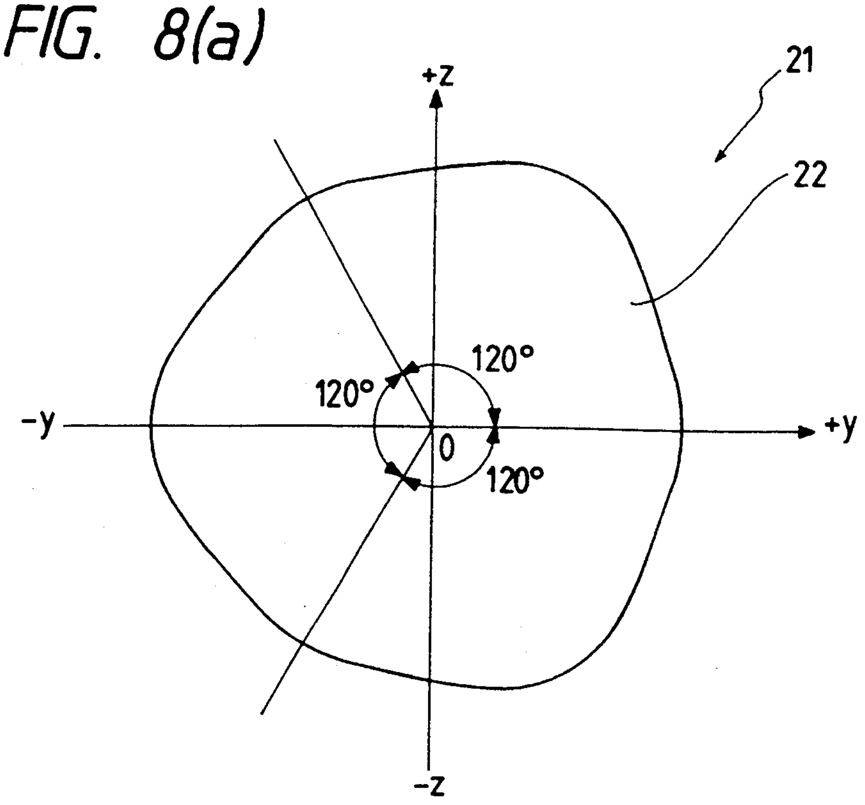
FIG. 8(*a*) is a front view of a reflector according to a first embodiment of the invention.
Figure 8B:
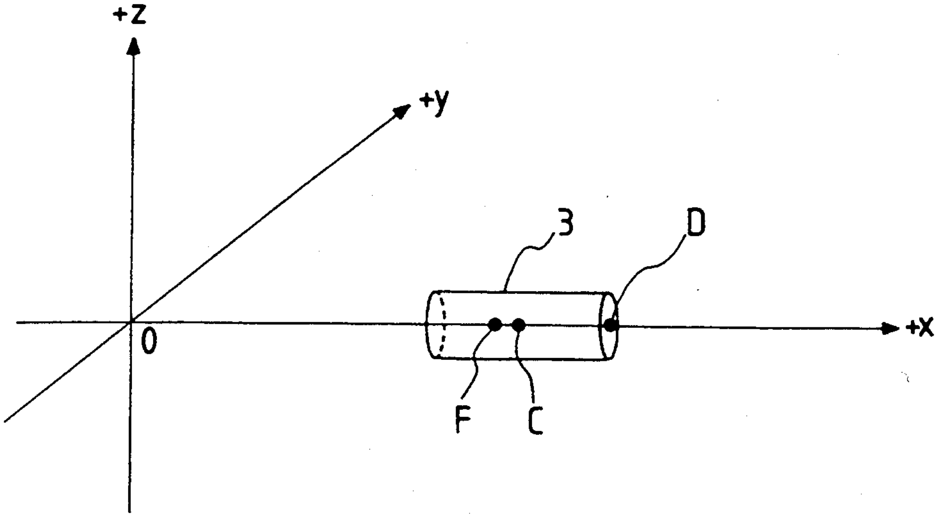

FIGS. 8(*a*)–10 relate to a first embodiment of the invention, which is intended to produce a light distribution pattern of a 3-apex star, i.e., a triangle.

FIG. 8(*a*) is a front view of a reflector 21, whose reflecting surface 22 is constructed according to the second method by arranging three sectors of a central angle 120° (derived from a sector existing on the right and left sides of the z-axis) around the optical axis. The fundamental surface 1 is expressed by Eq. 1 (θ=0).

Figure 9A:
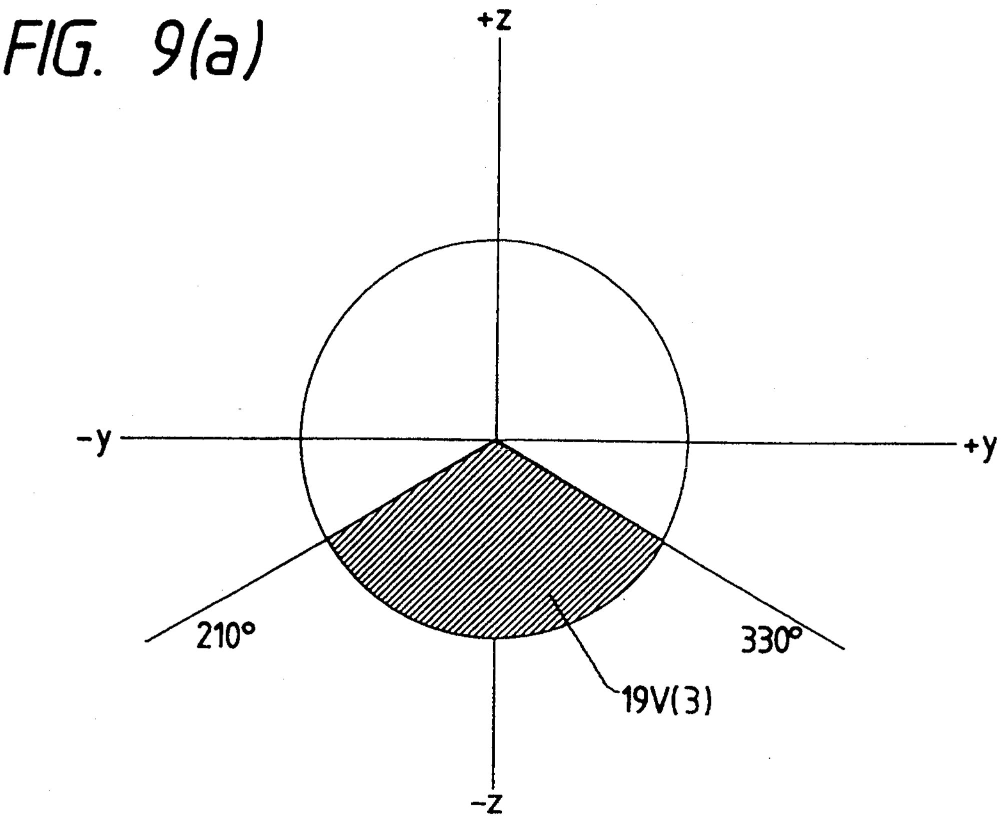
FIG. 9(*a*) is a front view showing a sector of the fundamental surface occupying an angular range $210° \leqq \theta \leqq 330°$.
Figure 9B:
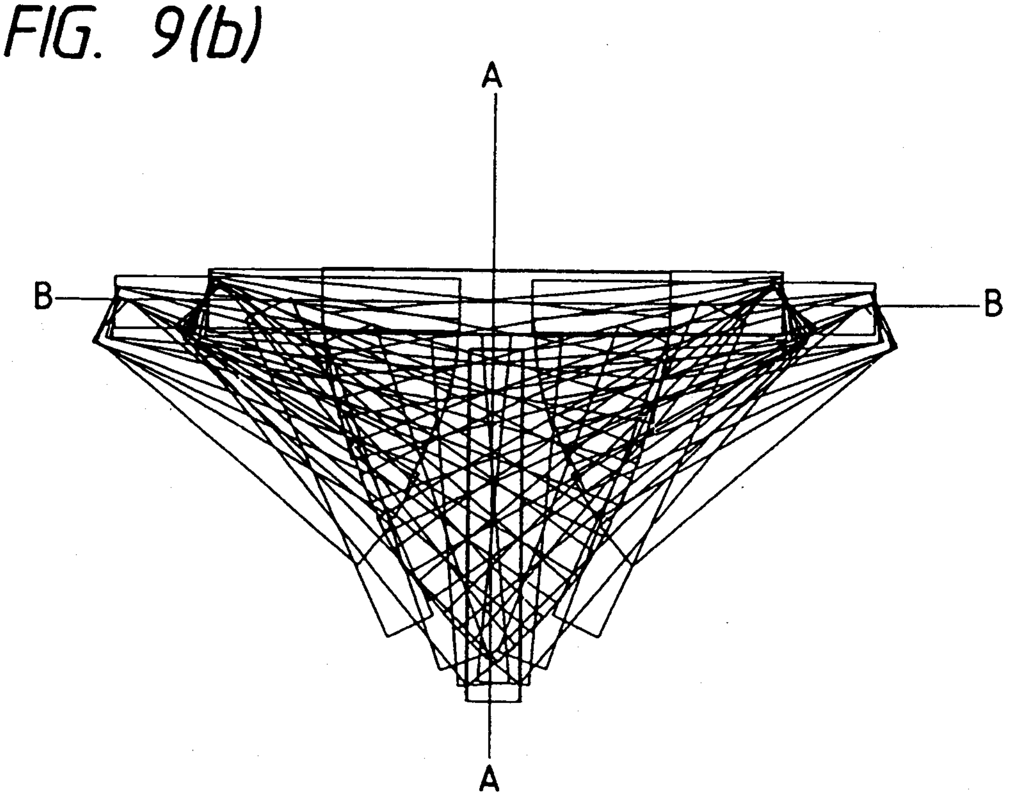

That is, the basic sector is obtained by rotating a sector 19V(3) (hatched in FIG. 9(*a*)) occupying an angular range 210°≦θ≦330° of the fundamental surface 1 about the x-axis by 150°. A reflecting surface is constructed by periodically disposing the basic sector around the x-axis.

FIG. 9(*b*) shows a projection pattern by the sector 19V(3) in the form of a collection of representative filament images. The projection pattern is generally shaped like an inverted triangle. As the reflecting point moves counterclockwise along a circle on the sector 19V(3) from $\theta=210°$ to 330°, the filament image moves from the base (on the axis B-B in FIG. 9(*b*)) of the triangle, to the left hypotenuse, then past the center line (on the axis A-A) to the right hypotenuse, and finally to the base.

FIG. 8(*b*) shows a positional relationship between a filament 3 and the foci. The filament 3 is disposed so that its central axis extends along the x-axis. The first focus F is located somewhat in the rear of the center C of the filament 3, and the second focus D is located at the front end of the filament 3.

Figure 10:
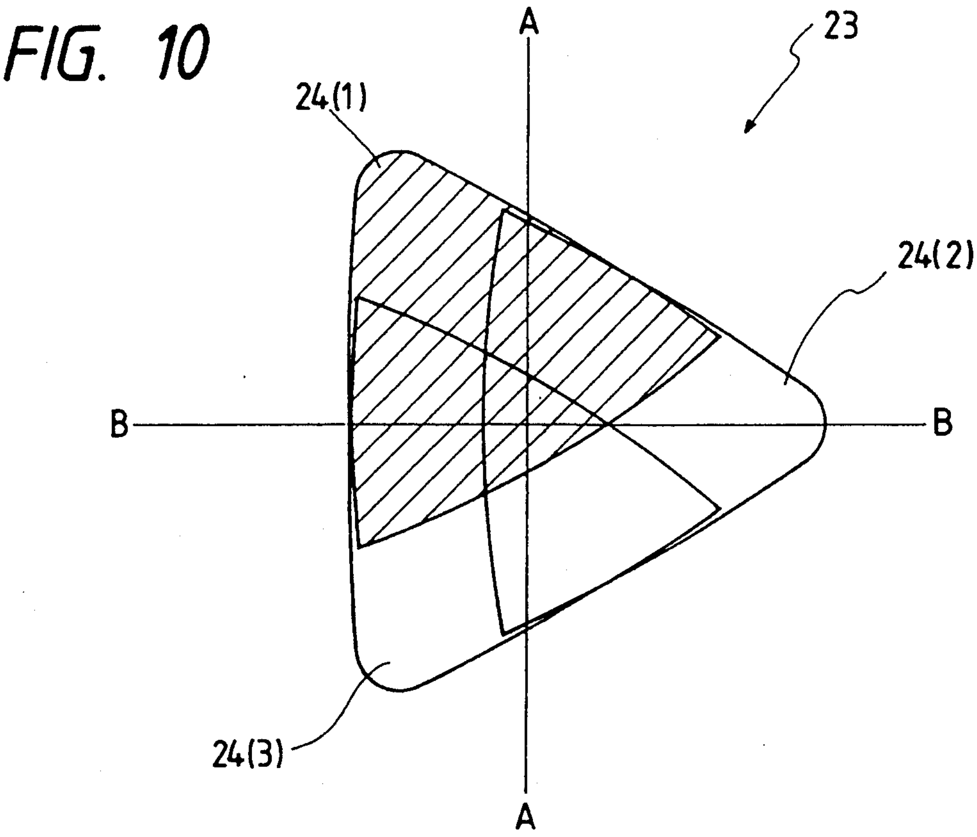
FIG. 10 schematically shows a light distribution pattern according to the first embodiment.

FIG. 10 shows a generally triangular projection pattern 23 produced by the reflector 21. A pattern 24(1) hatched in FIG. 10 is produced by a sector having the central angle of 120°. The pattern 24(1) is obtained by rotating the pattern of FIG. 9(*b*) by 150° clockwise.

The projection pattern 23 is formed as a combination of the pattern 24(1) and patterns 24(2) and 24(3) which are obtained by sequentially rotating the pattern 24(1) by 120° about the axis passing through the intersection of the axes A-A and B-B and extending perpendicularly to the paper surface of FIG. 10.

Figure 11A:
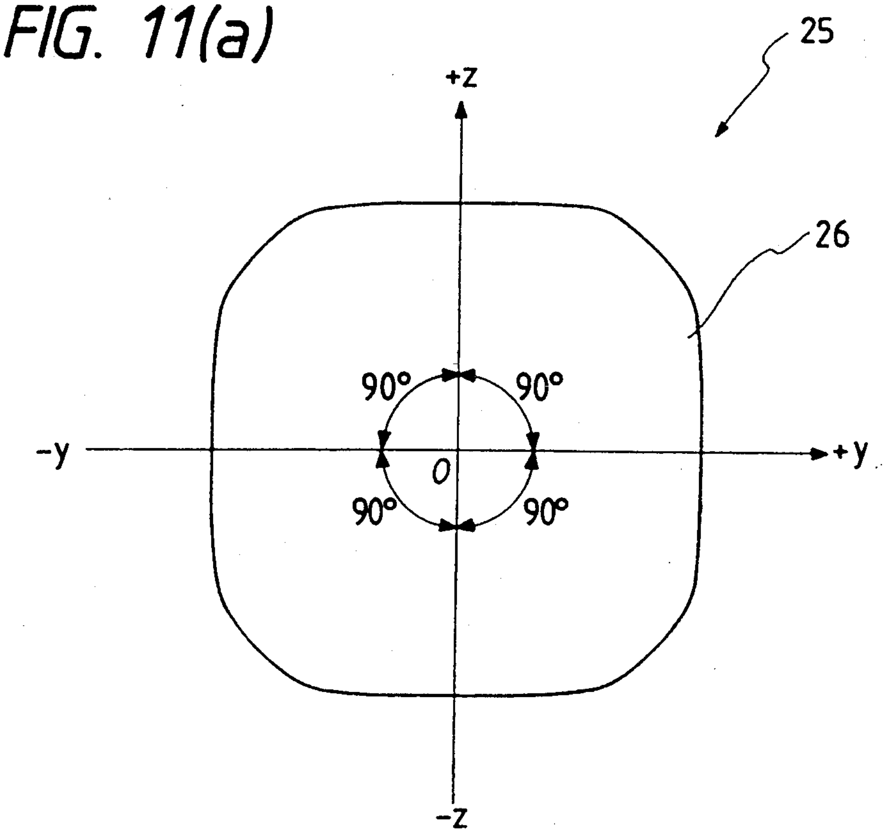
FIG. 11(*a*) is a front view of a reflector according to a second embodiment of the invention.
Figure 11B:
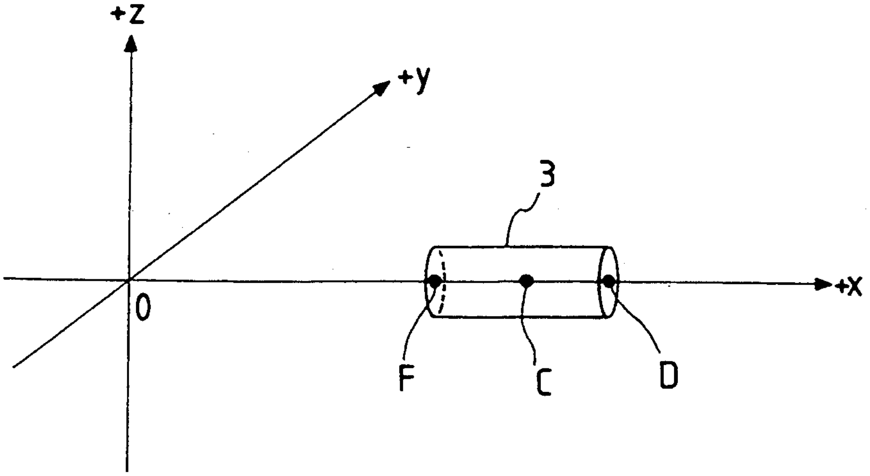

FIGS. 11(*a*)–14 relate to a second embodiment of the invention, which is intended to produce a light distribution pattern of a 4-apex star, i.e., a square.

FIG. 11(*a*) is a front view of a reflector 25, whose reflecting surface 26 is constructed according to the first method by arranging four sectors of a central angle 90° (derived from a sector existing above and below the y-axis) around the optical axis. The fundamental surface 1 is expressed by Eq. 1 ($\theta=0$).

Figure 12A:
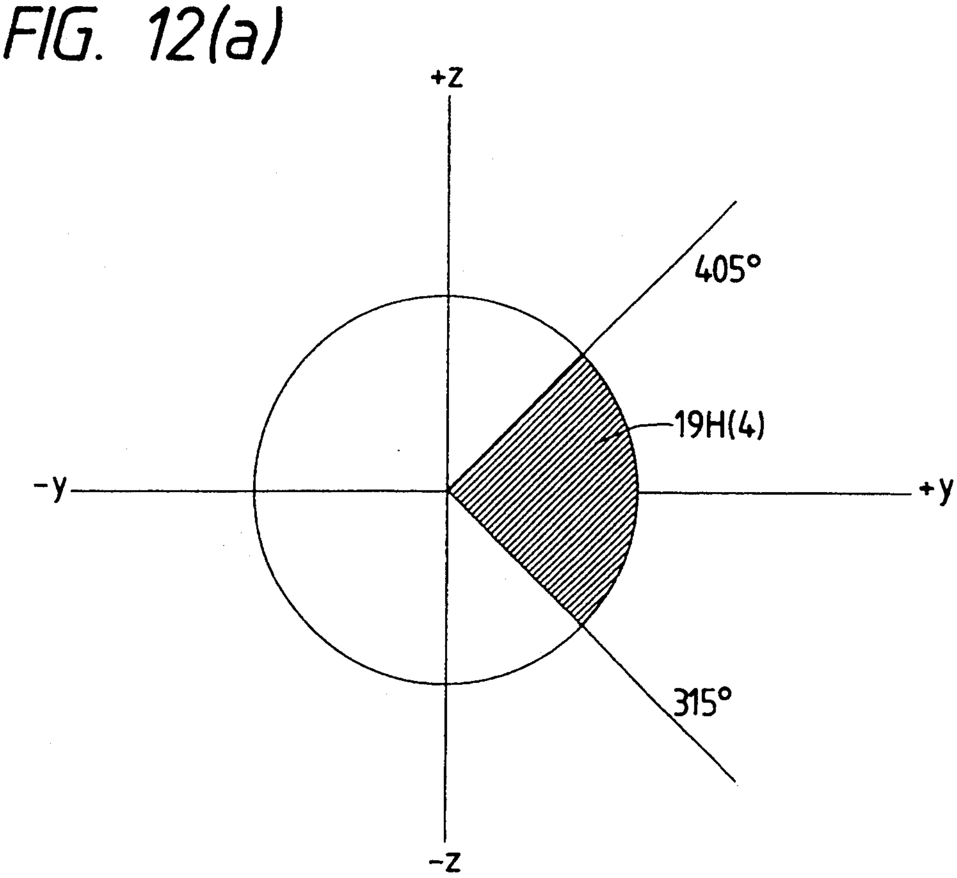
FIG. 12(*a*) is a front view showing a sector of the fundamental surface occupying an angular range $315° \leqq \theta \leqq 405°$.
Figure 12B:
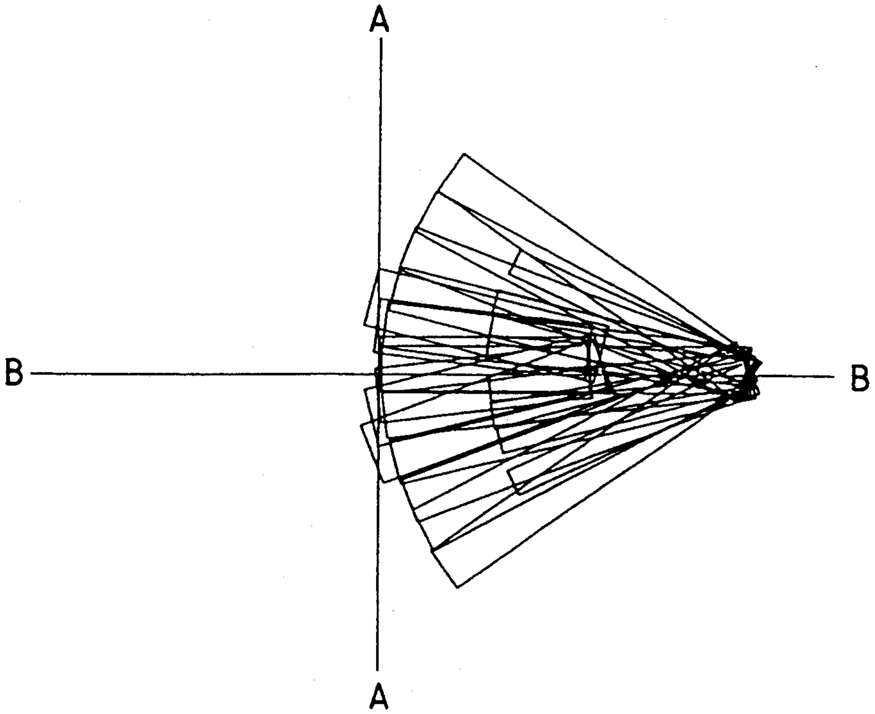

That is, the basic sector is obtained by rotating a sector 19H(4) (hatched in FIG. 12(*a*)) occupying an angular range $315° \leqq \theta \leqq 405°$ of the fundamental surface 1 about the x-axis by 45°. A reflecting surface is constructed by periodically disposing the basic sector around the x-axis.

FIG. 12(*b*) shows a projection pattern by the sector 19H(4) in the form of a collection of representative filament images. The projection pattern is a generally fan-shaped pattern. As the reflecting point moves counterclockwise along a circle on the sector 19H(4) from $\theta=315°$ to 405°, the filament image rotates clockwise about the apex of the fan-shaped pattern from the lower hypotenuse to the upper hypotenuse (see FIG. 12(*b*)).

FIG. 11(*b*) shows a positional relationship between the filament 3 and the foci. The filament 3 is disposed so that its central axis extends along the x-axis. The first focus F is located at the rear end of filament 3, and the second focus D is located at the front end of the filament 3.

Figure 13:
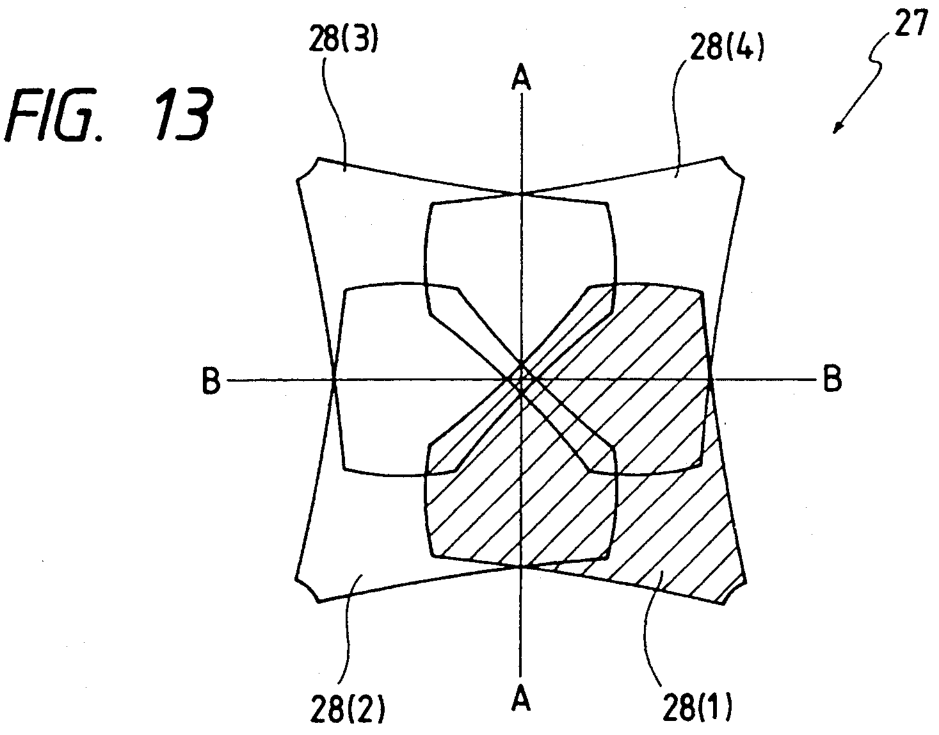
FIG. 13 schematically shows a light distribution pattern according to the second embodiment.

FIG. 13 shows a generally square projection pattern 27 produced by the reflector 25. A pattern 28(1) hatched in FIG. 13 is produced by a sector having the central angle of 90°. The pattern 28(1) is obtained by rotating the pattern of FIG. 12(*b*) by 45° clockwise.

The projection pattern 27 is formed as a combination of the pattern 28(1) and patterns 28(2)–28(4) which are obtained by sequentially rotating the pattern 28(1) by 90° about the axis passing through the intersection of the axes A-A and B-B and extending perpendicularly to the paper surface of FIG. 13. The projection pattern 27 is a square whose four sides are slightly curved so as to be convex toward the inside.

Figure 14:
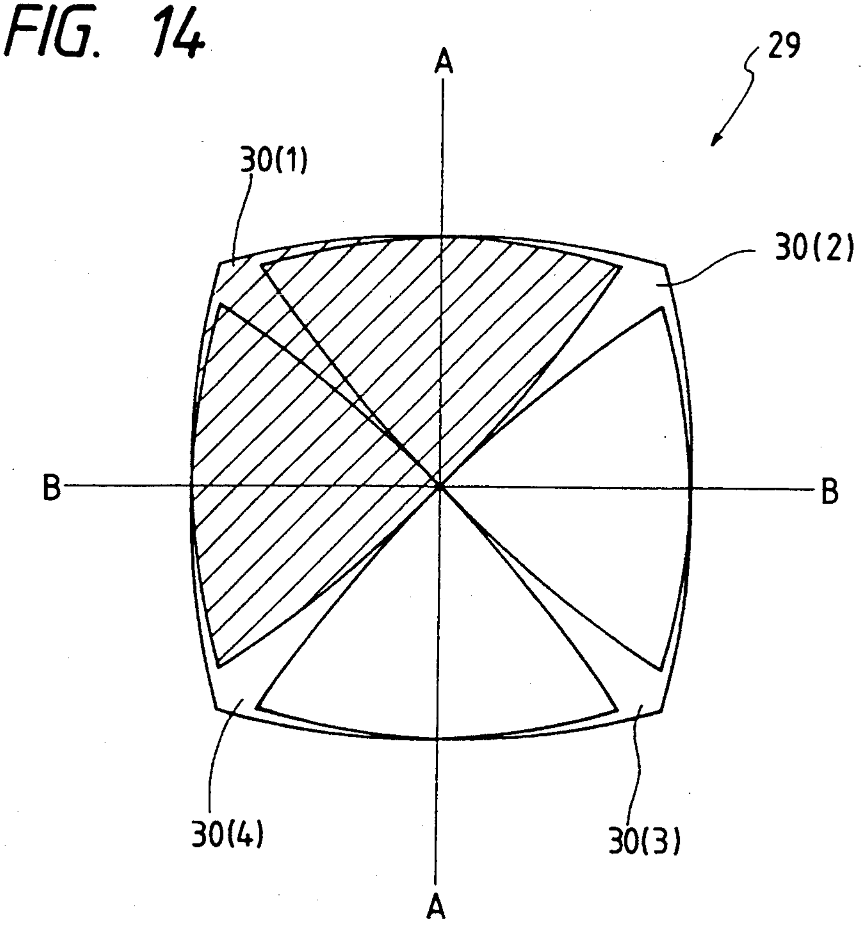
FIG. 14 shows a light-distribution pattern of a 4-apex star which is produced by a method different from that of FIGS. 11(*a*) and 11(*b*)

FIG. 14 shows a light distribution pattern of a 4-apex star obtained according to the second method. In this case, the positional relationship between the filament 3 and the foci are the same as in FIG. 11(*b*). A generally square projection pattern 29 is formed as a combination of a pattern 30(1) (hatched in FIG. 14, and produced by a sector having the central angle of 90°) and patterns 30(2)–30(4) which are obtained by sequentially rotating the pattern 30(1) by 90° about the axis passing through the intersection of the axes A-A and B-B and extending perpendicularly to the paper surface of FIG. 14. In the pattern 29, the four sides of a square are slightly curved so as to be convex toward the outside.

FIGS. 15–20 relate to a third embodiment of the invention, which is intended to produce a light distribution pattern of a 5-apex star.

Figure 15:
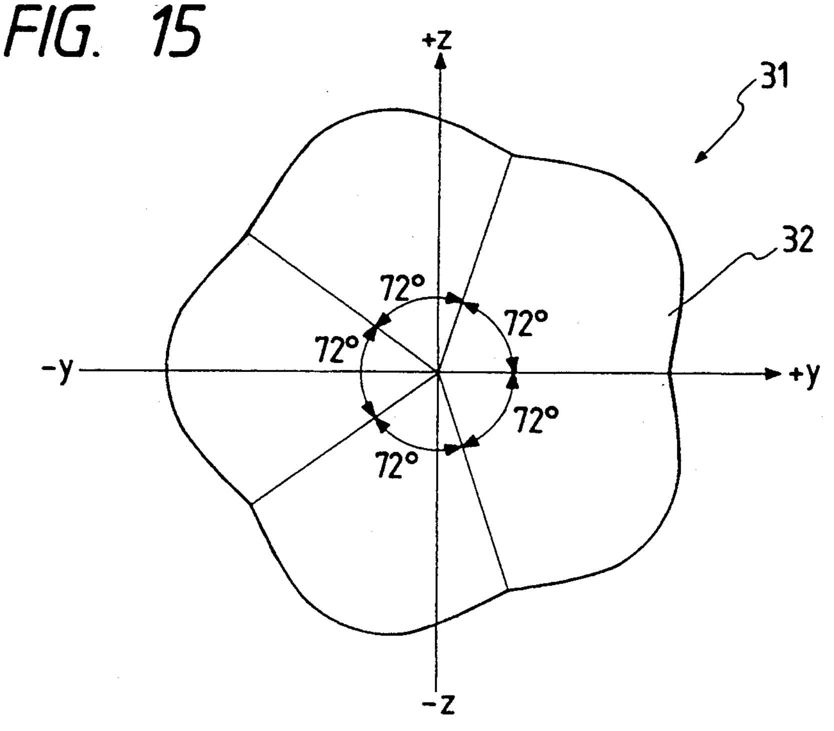
FIG. 15 is a front view of a reflector according to a third embodiment of the invention.

FIG. 15 is a front view of a reflector 31, whose reflecting surface 32 is constructed according to the second method by arranging five sectors of a central angle 72° (derived from a sector existing on the right and left sides of the z-axis) around the optical axis. The fundamental surface 1 is expressed by Eq. 1 ($\theta=0$).

Figure 16:
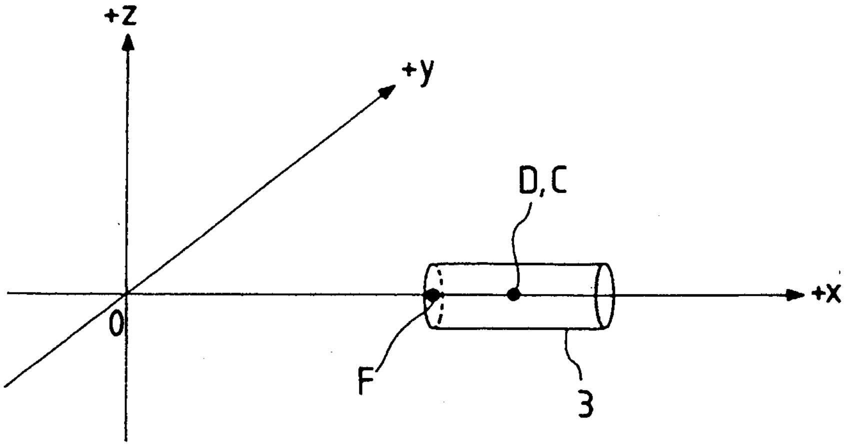
FIG. 16 shows a positional relationship between the filament and the foci in the third embodiment.

FIG. 16 shows a positional relationship between the filament 3 and the foci. The filament 3 is disposed so that its central axis extends along the x-axis. The first focus F is located at the rear end of filament 3, and the second focus D is located at the center C of the filament 3.

Figure 17:
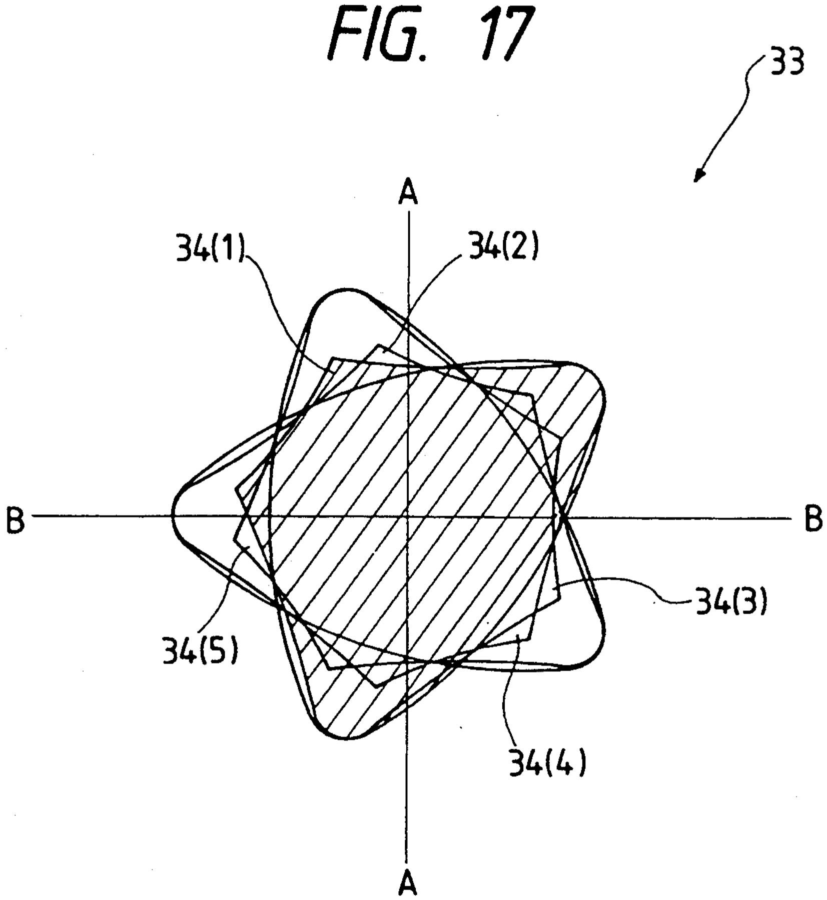
FIG. 17 schematically shows a light distribution pattern according to the third embodiment.

FIG. 17 shows a projection pattern 33 produced by the reflector 31. A pattern 34(1) hatched in FIG. 17 is produced by a sector having the central angle of 72°.

The projection pattern 33 is formed as a combination of the pattern 34(1) and patterns 34(2)–34(5) which are obtained by sequentially rotating the pattern 34(1) by 72° about the axis passing through the intersection of the axes A-A and B-B and extending perpendicularly to the paper surface of FIG. 17.

Figure 18:
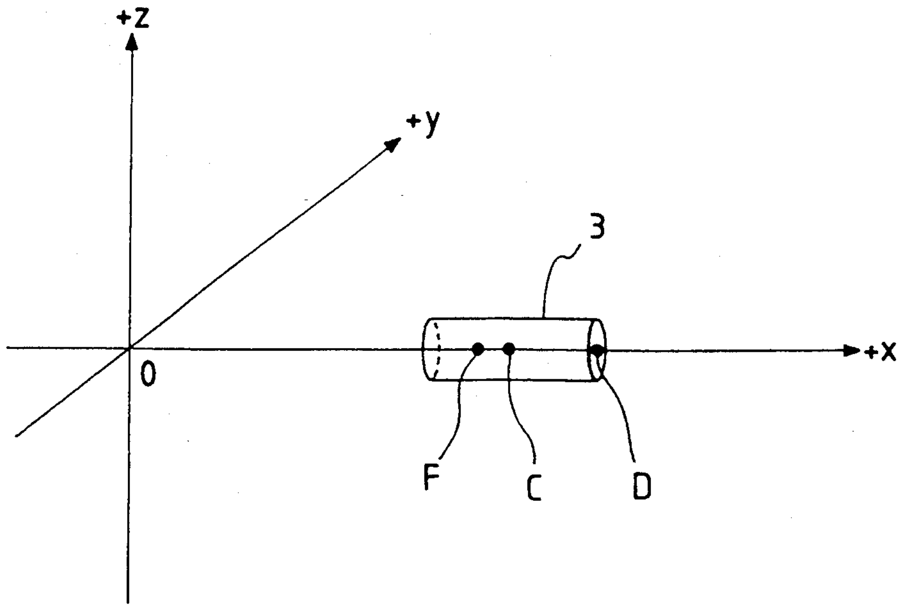
FIG. 18 shows a positional relationship between the filament and the foci in another example of producing a light distribution pattern of a 5-apex star.
Figure 19:
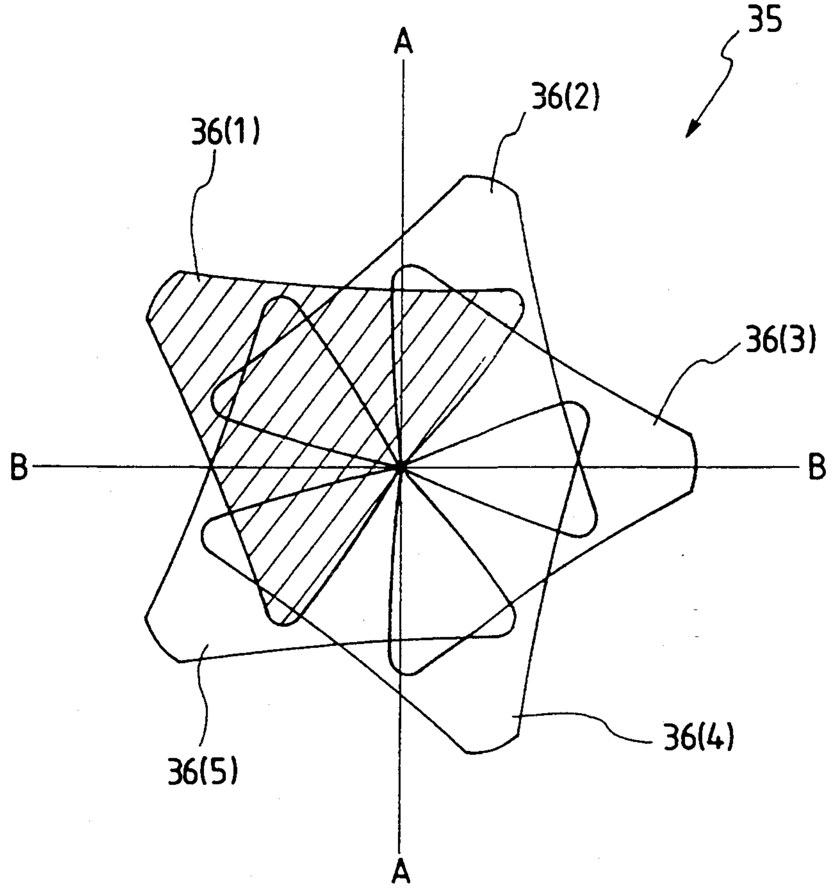
FIG. 19 shows a light distribution pattern of a 5-apex pattern corresponding to the positional relationship of FIG. 18.

FIG. 19 shows a projection pattern 35 of a 5-apex star obtained by employing a positional relationship between the filament 3 and the foci that is different from that of FIG. 16. In this case, as shown in FIG. 18, the first focus F is located somewhat in the rear of the center C of the filament 3, and the second focus D is located at the front end of the filament 3.

The projection pattern 35 is formed as a combination of a pattern 36(1) (hatched in FIG. 19, and produced by a sector having the central angle of 72°) and patterns 36(2)–36(5) which are obtained by sequentially rotating the pattern 36(1) by 72° about the axis passing through the intersection of the axes A-A and B-B and extending perpendicularly to the paper surface of FIG. 19.

Figure 20:
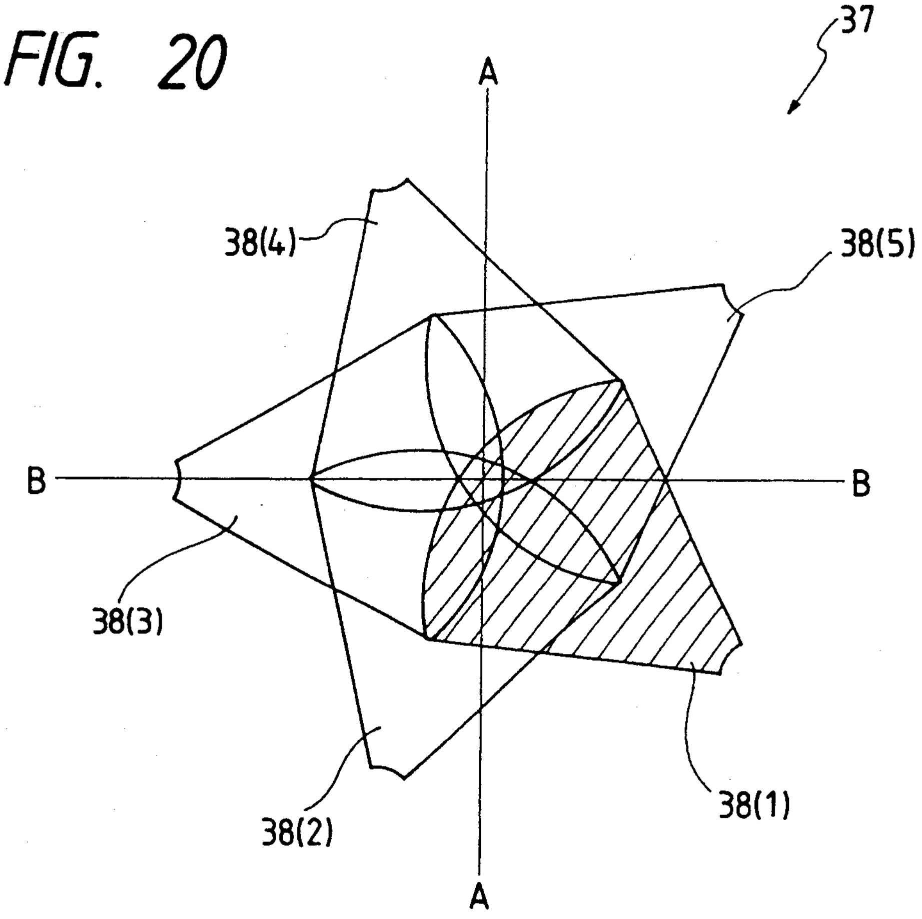
FIG. 20 shows a light distribution pattern of a 5-apex star produced by a method different from that of FIG. 15.

FIG. 20 shows a light distribution pattern 37 of a 5-apex star produced according to the first method. In this case, the positional relationship between the filament 3 and the foci is the same as that of FIG. 11(*b*). The first focus is located at the rear end of the filament 3, and the second focus D is located at the front end of the filament 3.

The projection pattern 37 is formed as a combination of a pattern 38(1) (hatched in FIG. 20, and produced by a sector having the central angle of 72°) and patterns 38(2)–38(5) which are obtained by sequentially rotating the pattern 38(1) by 72° about the axis passing through the intersection of the axes A-A and B-B and extending perpendicularly to the paper surface of FIG. 20.

Figure 21:
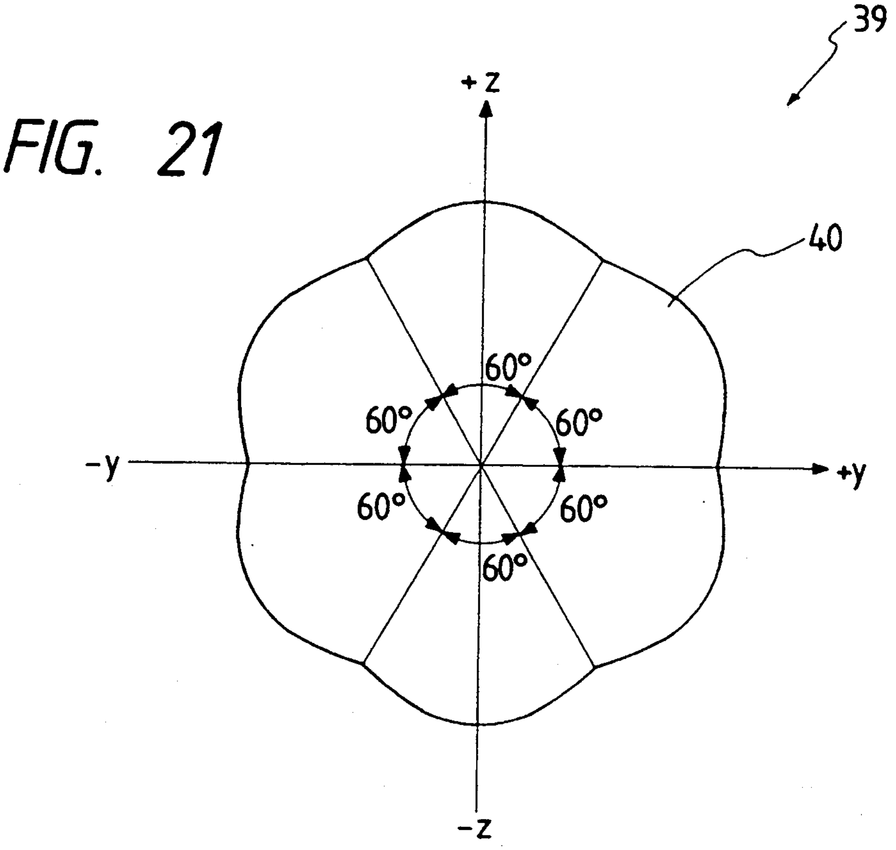
FIG. 21 is a front view of a reflector according to a fourth embodiment of the invention.
Figure 22:
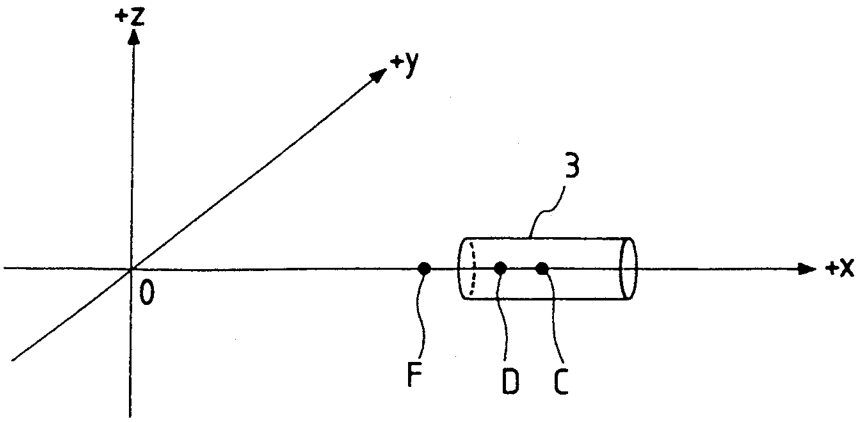
FIG. 22 shows a positional relationship between the filament and the foci in the fourth embodiment.
Figure 23:
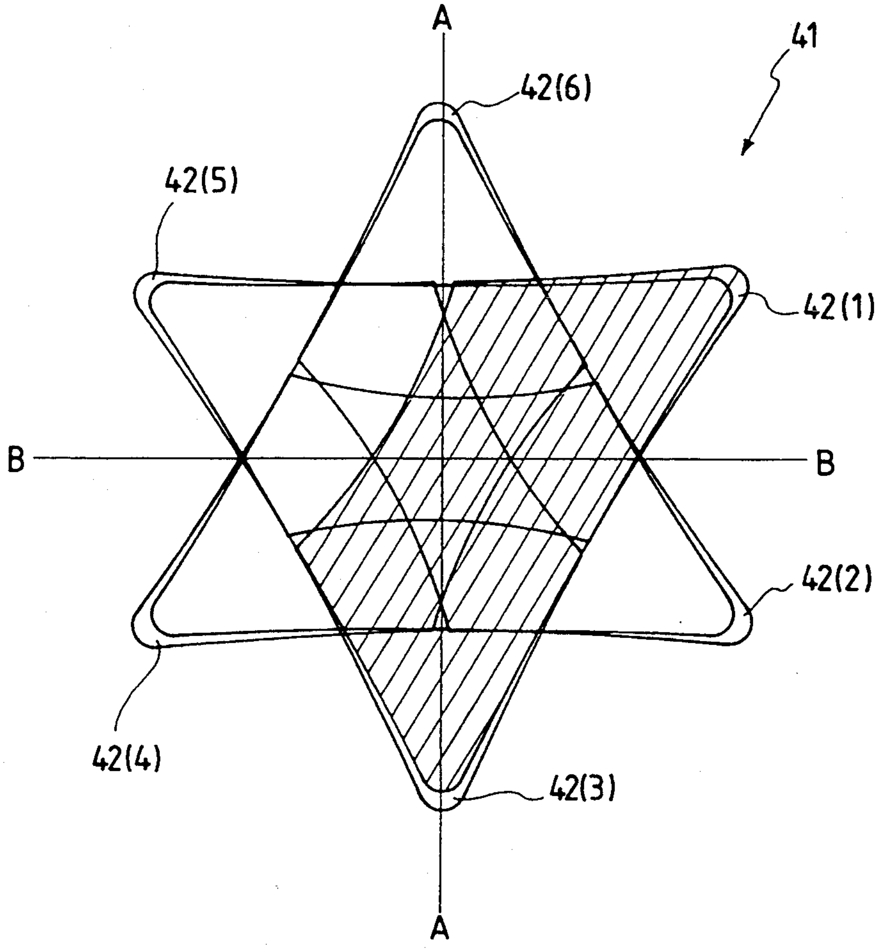
FIG. 23 schematically shows a light distribution pattern according to the fourth embodiment.
Figure 24:
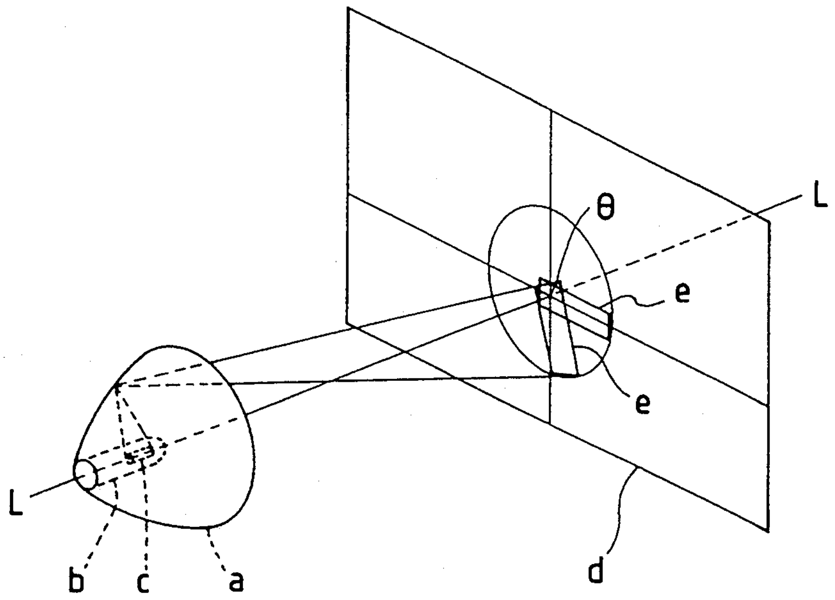
FIG. 24 PRIOR ART
FIG. 24 illustrates how a light distribution pattern is formed conventionally.
Figure 25:
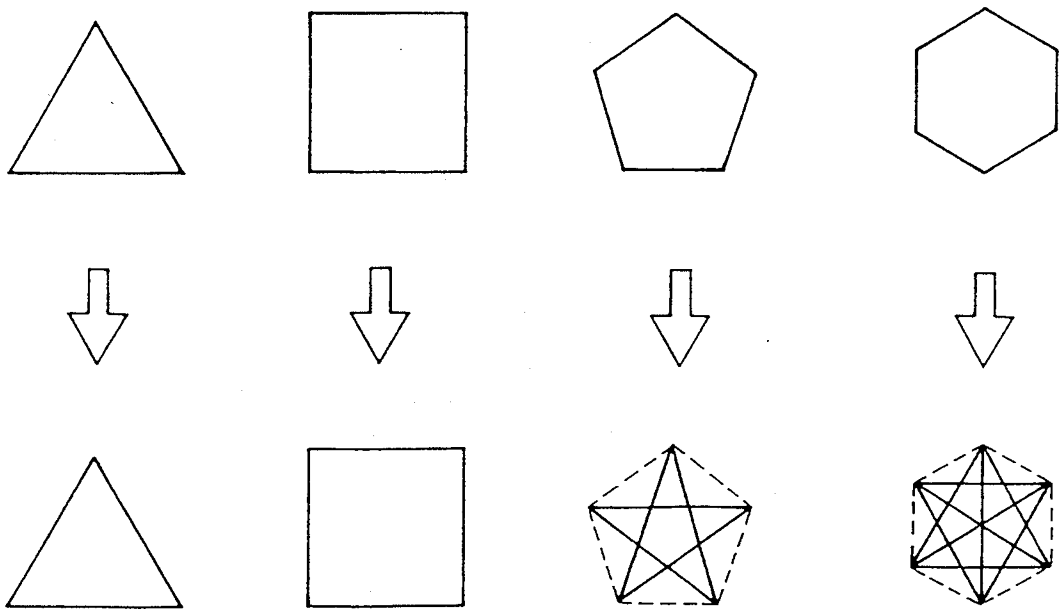
FIG. 25 shows a relationship between regular polygons and corresponding n-apex stars.

FIGS. 21–23 relate to a fourth embodiment of the invention, which is intended to produce a light distribution pattern of a 6-apex star.

FIG. 21 is a front view of a reflector 39, whose reflecting surface 40 is constructed according to the second method by arranging six sectors of a central angle 60° (derived from a sector existing on the right and left sides of the z-axis) around the optical axis. The fundamental surface 1 is expressed by Eq. 2 ($\theta=30°$).

FIG. 22 shows a positional relationship between the filament 3 and the loci. The filament 3 is disposed so that its central axis extends along the x-axis. The first focus F is located a certain distance in the rear of the rear end of the filament 3, and the second focus D is located between the center C and the rear end of the filament 3.

FIG. 23 shows a projection pattern 41 produced by the reflector 39. A pattern 42(1) hatched in FIG. 23 is produced by a sector having the central angle of 60°.

The projection pattern 41 is formed as a combination of the pattern 42(1) and patterns 42(2)–42(6) which are obtained by sequentially rotating the pattern 42(1) by 60° about the axis passing through the intersection of the axes A-A and B-B and extending perpendicularly to the paper surface of FIG. 23.

As described above, a pattern of an n-apex star can be obtained by a combination of n sectors derived from a predetermined sector of the fundamental surface 1. This is due to the fact that apex portions of an n-apex star can be formed by filament images arranged as shown in FIG. 7.

As described above, according to the illumination lamp reflector of the invention, filament images projected by points on an intersecting line obtained by cutting the fundamental surface by a plane in parallel with the xz-plane are arranged with a point on a line corresponding to the reference plane as the rotation center (that is, not arranged radially). A light distribution pattern of an n-apex star, which cannot be obtained by a paraboloid-of-revolution reflector, can be produced only by the action of the reflector, by taking a portion of the fundamental surface capable of producing the apex portion of the n-apex star and sequentially rotating that portion about the optical axis of the reflector by an angle in accordance with the number of apices to provide a periodic arrangement of reflecting sectors.

The portion of the fundamental surface, which is the unit of the periodic arrangement, may be located in the vicinity of the xy-plane or the xz-plane. Depending on which portion is used, the light distribution patterns for the same n-apex star have different manners of the filament arrangement.

What is claimed is:

1. An illumination lamp for producing a light distribution pattern having at least three apices on a distant front screen, comprising:

a reflecting surface having an optical axis and a fundamental surface which, when an xyz orthogonal coordinate system is set so that it defines an x-y plane and that a x-axis coincides with the optical axis, has a reference point on the x-axis and a reference parabola included in a plane inclined, in a generalized form, from the xy-plane and having a vertex on the origin of the coordinate system and a focus on the x-axis between said origin and the reference point, and which is a collection of intersecting lines each obtained by cutting an imaginary paraboloid of revolution having an axis extending in parallel with a ray vector direction taken by a reflected ray after being emitted from the reference point and then reflected at a reflecting point on a parabola that is an orthogonal projection of the reference parabola onto the xy-plane, passing through the reflecting point, and having a focus at the reference point by a plane in a parallel with a z-axis and including the ray vector, said reflecting surface being formed by periodically arranging identical reflecting sectors equal in number to the number of apices of the pattern around the optical axis, each of the reflecting sectors having a shape of a generally fan-shaped portion of the fundamental surface having a central angle determined in accordance with the number of apices of the pattern and located in the vicinity of the xy-plane or xz-plane; and a light source having a central axis extending along the optical axis.

2. The illumination lamp of claim 1, wherein the central angle of the fan-shaped portion is 360° divided by the number of apices of the pattern when viewed from a front side.

3. The illumination lamp of claim 1, wherein the generally fan-shaped portion is symmetrical with respect to the xy-plane or the xz-plane.

4. The illumination lamp of claim 1, wherein the reference parabola is included in the xy-plane.

5. An illumination lamp for producing a light distribution pattern having at least three apices on a distant front screen, comprising:

a light source having a central axis extending along an optical axis of a reflecting surface; and the reflecting surface comprising generally fan-shaped, identical reflecting sectors equal in number to the number of apices of the pattern, each of the reflecting sectors producing a generally triangular light distribution pattern having a base, a first leg and a second leg, wherein an image of the light source on the screen rotates from said first leg of the generally triangular pattern to said second leg with an apex of the generally triangular pattern as a rotation center.

6. The illumination lamp of claim 5, wherein the image of the light source rotates with the apex of the generally triangular pattern as the rotation center as a reflection point on the reflecting surface moves along a circle around the optical axis.

7. An illumination lamp for producing a light distribution pattern having at least three apices on a distant front screen, comprising:

a light source having a central axis extending along an optical axis of a reflecting surface; and the reflecting surface comprising generally fan-shaped, identical reflecting sectors equal in number to the number of apices of the pattern, each of the reflecting sectors producing a generally triangular light distribution pattern having a base, a first leg and a second leg, wherein an image of the light source on the screen moves from the base of the generally triangular pattern, to said first leg, then past a center line to said second leg, and finally to the base.

8. The illumination lamp of claim 7, wherein the image of the light source moves as recited in claim 7 as reflection point on the reflecting surface moves along a circle around the optical axis.

9. An illumination lamp as recited in claim 1, wherein said light distribution pattern is triangular.

10. An illumination lamp as recited in claim 1, wherein said light distribution pattern is square.

11. An illumination lamp as recited in claim 1, wherein said light distribution pattern is stellate.

12. An illumination lamp as recited in claim 5, wherein said light distribution pattern is triangular.

13. An illumination lamp as recited in claim 5, wherein said light distribution pattern is square.

14. An illumination lamp as recited in claim 5, wherein said light distribution pattern is stellate.

15. An illumination lamp as recited in claim 7, wherein said light distribution pattern is triangular.

16. An illumination lamp as recited in claim 7, wherein said light distribution pattern is square.

17. An illumination lamp as recited in claim 7, wherein said light distribution pattern is stellate.

* * * * *